United States Patent
Shin et al.

(10) Patent No.: US 10,396,408 B2
(45) Date of Patent: Aug. 27, 2019

(54) WASTE BATTERY TREATMENT APPARATUS USING CONTINUOUS HEAT TREATMENT, AND METHOD FOR RECOVERING VALUABLE METALS FROM LITHIUM-BASED BATTERY USING SAME

(71) Applicant: KOREA INSTITUTE OF GEOSCIENCE AND MINERAL RESOURCES, Daejeon (KR)

(72) Inventors: Shun Myung Shin, Daejeon (KR); Sung Ho Ju, Jinju-si (KR); Dong Ju Shin, Daejeon (KR); Jei Pil Wang, Busan (KR); Chang Hyun Oh, Daejeon (KR)

(73) Assignee: KOREA INSTITUTE OF GEOSCIENCE AND MINERAL RESOURCES (KIGAM), Daejeon (KR)

( * ) Notice: Subject to any disclaimer, the term of this patent is extended or adjusted under 35 U.S.C. 154(b) by 103 days.

(21) Appl. No.: 15/547,847

(22) PCT Filed: Feb. 4, 2016

(86) PCT No.: PCT/KR2016/001266
§ 371 (c)(1),
(2) Date: Aug. 1, 2017

(87) PCT Pub. No.: WO2016/129877
PCT Pub. Date: Aug. 18, 2016

(65) Prior Publication Data
US 2018/0026318 A1    Jan. 25, 2018

(30) Foreign Application Priority Data
Feb. 11, 2015    (KR) ........................ 10-2015-0021221

(51) Int. Cl.
*H01M 10/54* (2006.01)
*H01M 10/42* (2006.01)
(Continued)

(52) U.S. Cl.
CPC ....... *H01M 10/54* (2013.01); *H01M 10/0525* (2013.01); *H01M 10/42* (2013.01);
(Continued)

(58) Field of Classification Search
CPC ........................... H01M 10/54; H01M 10/052
See application file for complete search history.

(56) References Cited

U.S. PATENT DOCUMENTS

| 5,612,150 A | * 3/1997 | Nishimura ............ H01M 10/54 |
|---|---|---|
| | | 429/49 |
| 2003/0180604 A1 | 9/2003 | Zenger et al. |
| 2008/0264343 A1 | 10/2008 | Hagihara |

FOREIGN PATENT DOCUMENTS

| JP | 2000-54039 | 2/2000 |
|---|---|---|
| JP | 2003243051 | 8/2003 |

(Continued)

OTHER PUBLICATIONS

NOA for the corresponding JP Application No. 2017-542179 issued by JPO dated Aug. 3, 2018.

*Primary Examiner* — Olatunji A Godo
(74) *Attorney, Agent, or Firm* — Lex IP Meister, PLLC (57) ABSTRACT

The present invention relates to a waste battery treatment apparatus using continuous heat treatment, and a method for recovering valuable metals from lithium-based batteries using the same, the waste battery treatment apparatus comprising: a frame (10); a reaction reservoir (30) which is disposed in the inner space of the frame (10) and has thereinside a treatment space (S1) in which waste batteries to be treated are disposed; an inlet 34 (33) in which a gas blocking door (34) is disposed so as to selectively communicate the treating space (S1) with the outside, and which serves as a path through which an object to be treated is inputted to the treating space (S1) of the reaction reservoir (30). In addition, the waste battery treatment apparatus is
(Continued)

provided with a vacuum forming means (40) which is connected to the treatment space (S1) of the reaction reservoir (30) to vacuumize the treatment space (S1). In the treatment apparatus of the present invention, since the inside of the reaction reservoir (30) is vacuumized and, at the same time, an inert gas is injected thereinto while a pretreatment process of waste batteries is performed in the reaction reservoir (30), the waste batteries are prevented from exploding during heat treatment, whereby work stability can be improved.

2 Claims, 5 Drawing Sheets

(51) Int. Cl.
*H01M 10/0525* (2010.01)
*H01M 10/054* (2010.01)
*H01M 10/52* (2006.01)

(52) U.S. Cl.
CPC ...... *H01M 10/4242* (2013.01); *H01M 10/054* (2013.01); *H01M 10/4207* (2013.01); *H01M 10/52* (2013.01); *Y02P 10/212* (2015.11); *Y02W 30/84* (2015.05)

(56) References Cited

FOREIGN PATENT DOCUMENTS

| | | |
|---|---|---|
| JP | 2013-23394 | 2/2013 |
| KR | 20050096038 | 10/2005 |
| KR | 100823987 | 4/2008 |
| KR | 10-2008-0095781 | 10/2008 |
| KR | 20130091420 | 8/2013 |

* cited by examiner

WASTE BATTERY TREATMENT APPARATUS USING CONTINUOUS HEAT TREATMENT, AND METHOD FOR RECOVERING VALUABLE METALS FROM LITHIUM-BASED BATTERY USING SAME

TECHNICAL FIELD

The present invention relates to a treatment apparatus for recovering metals from a waste battery and a method thereof, and more particularly, to a waste battery treatment apparatus using continuous heat treatment in which a pretreatment process for recovering metals from a waste battery is continuously heat-treated in a reaction reservoir using vacuum and inert gas, and a method for recovering valuable metals from a lithium-based battery using the same.

BACKGROUND ART

Waste batteries are called, for example, wastes generated when the life-spans of primary batteries used as power sources for various electronic devices including remote controllers, calculators, radios, electronic clocks, cassettes, toys, and the like and rechargeable secondary batteries including batteries for mobile phones, notebooks, and automobiles have ended.

The waste batteries include valuable metals including silver, cobalt, nickel, zinc, manganese, lithium, copper, and the like. Therefore, in order to efficiently recycle finite resources, development of technology for recovering the valuable metals from the waste batteries is required. In addition, since KOH, NH4Cl, lithium salt, H2SO4, and the like are used as electrolytes in the waste batteries in addition to lead, cadmium, mercury, and the like which are hazardous metals, it is necessary to develop recycling technology in consideration of environmental impacts.

In waste battery recycling technologies developed in the related art, a process of classifying collected waste batteries by respective batteries, such as the primary battery and the secondary battery, a process of crushing the classified waste batteries, a process of classifying the crushed materials by a sieve, and a process for sorting metals to be recovered and residues are performed as a pretreatment process.

However, in this related art, the processes of classifying the collected waste batteries by the batteries of the primary cell and the secondary battery and crushing the classified waste batteries are required. In the process of directly crushing the waste batteries, there is a risk of explosion of the battery and further, generated electrolytes and gas are exposed to the atmosphere, thereby giving a great burden to an environment.

In view of this, a method for recovering valuable metals from waste batteries by a method disclosed in a prior art document has been provided, but here, work is performed by inputting only a predetermined amount of waste batteries into a reaction reservoir at a time. Therefore, there is a problem that it is difficult to mass-treat the waste batteries in the pretreatment process of the waste batteries because the amount of the waste batteries which may be treated at a time is relatively small.

In addition, even in the related art using the reaction reservoir, since there is still the risk of explosion inside the reaction reservoir, stability is lowered and there is also a problem in that it is inconvenient to take out a treated material from the reaction reservoir to the outside after heat treatment.

Technical Problem

The present invention has been made an effort to solve the problems in the related art and an object of the present invention is to enable a pretreatment process to be performed by continuously inputting waste batteries into a reaction reservoir.

Another object of the present invention is to reduce a risk of explosion in the reaction reservoir during a heat treatment process.

Yet another object of the present invention is to enable a treated material of which heat treatment is completed to be easily discharged to the outside and the treated material to be easily input into the reaction reservoir.

Technical Solution

A waste battery treatment apparatus is configured to include a formed reaction reservoir; an inlet which has a gas blocking door positioned therein so as to selectively communicate a treatment space and the outside and becomes a path for inputting an object to be treated into the treatment space of the reaction reservoir; and a vacuum forming means which is connected with the treatment space of the reaction reservoir to vacuumize the treatment space.

The reaction reservoir further includes a gas inlet for inputting inert gas into the treatment space from the outside in connection with the treatment space of the reaction reservoir.

A rotary pump is provided in the vacuum forming means to selectively vacuumize the inside of the treatment space of the reaction reservoir.

A gas outlet is provided in the reaction reservoir to discharge poisonous gas and dust generated in the treatment space to the outside.

A connection pipe is provided between the gas outlet and the inlet to prevent the poisonous gas and the dust in the treatment space to the outside through the inlet.

An upper end of the inlet obliquely extends in a central direction of the reaction reservoir and an entrance is formed at the upper end of the inlet.

A storage device storing a waste battery which is the object to be treated is selectively inserted into the reaction reservoir, a moving device is provided at a lower portion of the storage device and the frame and the reaction reservoir are opened to one side, and as a result, the storage device is inserted into the treatment space of the reaction reservoir or separated from the treatment space through one opened side of the reaction reservoir.

A shielding plate is provided in the storage device to shield one opened side of the treatment space when the storage device is positioned in the treatment space of the reaction reservoir.

The storage device includes a lower frame with the moving device, an upper frame which extends upward from the lower frame, and a basket provided in the upper frame and having a storage space capable of the object to be treated therein.

The basket is configured to be separated from the upper frame and a hanger selectively hung by a hoist is provided in the basket, and as a result, the basket is elevatable by the hoist.

The moving device is configured by a wheel or a moving rail.

According to another feature of the present invention, in the present invention, a method for recovering valuable metals by a continuous heat treatment process from a lithium-based battery by using a waste battery treatment apparatus using continuous heat treatment, which includes a frame, a reaction reservoir, a vacuum forming means, and an inlet, includes: a vacuum forming step of vacuumizing the inside of the reaction reservoir by using the vacuum forming means; a heat treatment step of inputting and heat-treating waste batteries to be treated by opening a gas blocking door of the inlet; a closing step of closing the gas blocking door in order to prevent poisonous gas or dust in the reaction reservoir from being discharged to the outside after the waste battery inputting step; a gas discharging step of discharging the poisonous gas and dust generated during the heat treatment through a gas outlet; a gas treatment step of separating and treating valuable metal powder included in the discharged dust in the gas discharging step; a collection step of collecting the waste battery heat-treated through the heat treatment step from the reaction reservoir; and a step of crushing or grinding the collected waste battery and thereafter, separating and recovering the valuable metal powder of the crushed or ground waste battery.

The method further includes a step of injecting inert gas into a treatment space through a gas inlet in order to prevent the inside of the reaction reservoir from exploding subsequently to the vacuum forming step.

The method further includes a storage device inserting step of inputting an object to be treated into a storage device input into/output from the treatment space of the reaction reservoir and thereafter, moving the storage device and inserting the storage device into the treatment space of the reaction reservoir prior to the heat treatment step.

The method further includes a reaction reservoir separating step of separating the storage device from the treatment space of the reaction reservoir and discharging the separated storage device to the outside prior to the collection step.

The method further includes a step of injecting inert gas into a treatment space through a gas inlet in order to prevent the inside of the reaction reservoir from exploding subsequently to the vacuum forming step.

Advantageous Effects

In the waste battery treatment apparatus using continuous heat treatment and the method for recovering valuable metals from a lithium-based battery using same according to the present invention, which are described above, the following effects can be expected.

First, since the treatment apparatus according to the present invention allows the waste battery to be input into the reaction reservoir even while a heat treatment operation is performed in the reaction reservoir, a pretreatment amount in the waste battery treatment apparatus can be greatly increased, thereby obtaining more valuable metals from the waste batteries more quickly.

Further, in the treatment apparatus of the present invention, in the course of the pretreatment process for the waste battery in the reaction reservoir, the inside of the reaction reservoir is formed in a vacuum state and inert gas is injected to prevent the waste battery from exploding during the heat treatment, and as a result, work stability is improved and durability of the treatment apparatus is enhanced.

In addition, in the treatment apparatus of the present invention, a storage apparatus is provided so as to be movable to the side of the treatment apparatus, and the treatment apparatus is first separated out of the reaction reservoir and the waste battery which is a treated material is input and thereafter, positioned in the reaction reservoir to be heat-treated and after the heat treatment, the waste battery is separated again to be discharged to the outside, and as a result, treatment workability is enhanced, thereby improving productivity.

Further, there is also an effect that poisonous gas and dust are not directly discharged to the outside from the inside of the reaction reservoir but discharged through a gas outlet and then, treated and discharged to the atmosphere, thereby recovering the valuable metals in a more environmentally friendly manner.

In addition, in the present invention, since an inlet for inputting an object to be treated into the reaction reservoir and the gas outlet are connected to each other, the poisonous gas and dust generated inside the reaction reservoir are also prevented from being discharged to the outside of the reaction reservoir through the inlet, thereby enabling a more improved environmentally friendly work process.

MODE FOR INVENTION

Hereinafter, some embodiments of the present invention will be described in detail through exemplary drawings. When reference numerals refer to components of each drawing, it is to be noted that although the same components are illustrated in different drawings, the same components are denoted by the same reference numerals as possible. Further, in describing the embodiments of the present invention, a detailed explanation of known related configurations and functions may be omitted to avoid interruption of understanding of the embodiments of the present invention.

In describing the components of the embodiments of the present invention, terms including first, second, A, B, (a), (b), and the like may be used. These terms are just intended to distinguish the components from other components, and the terms do not limit the nature, sequence, or order of the components. When it is disclosed that any component is "connected", "coupled", or "linked" to other components, it should be understood that the component may be directly connected or linked to other components, but another component may be "connected", "coupled", or "linked" between the respective components.

In a waste battery treatment apparatus (hereinafter, referred to as 'waste battery treatment apparatus') using continuous heat treatment according to the present invention, a frame 10 (see FIG. 4) configures an exterior and a framework of the waste battery treatment apparatus. The frame 10 is made of stainless steel to withstand internal and external loads of the treatment apparatus and particularly, serves to stably protect an internal soundproof material (not illustrated). The frame 10 need not be particularly made of the stainless steel and may be generally made of a metallic material having the same or similar function.

Figure 1:
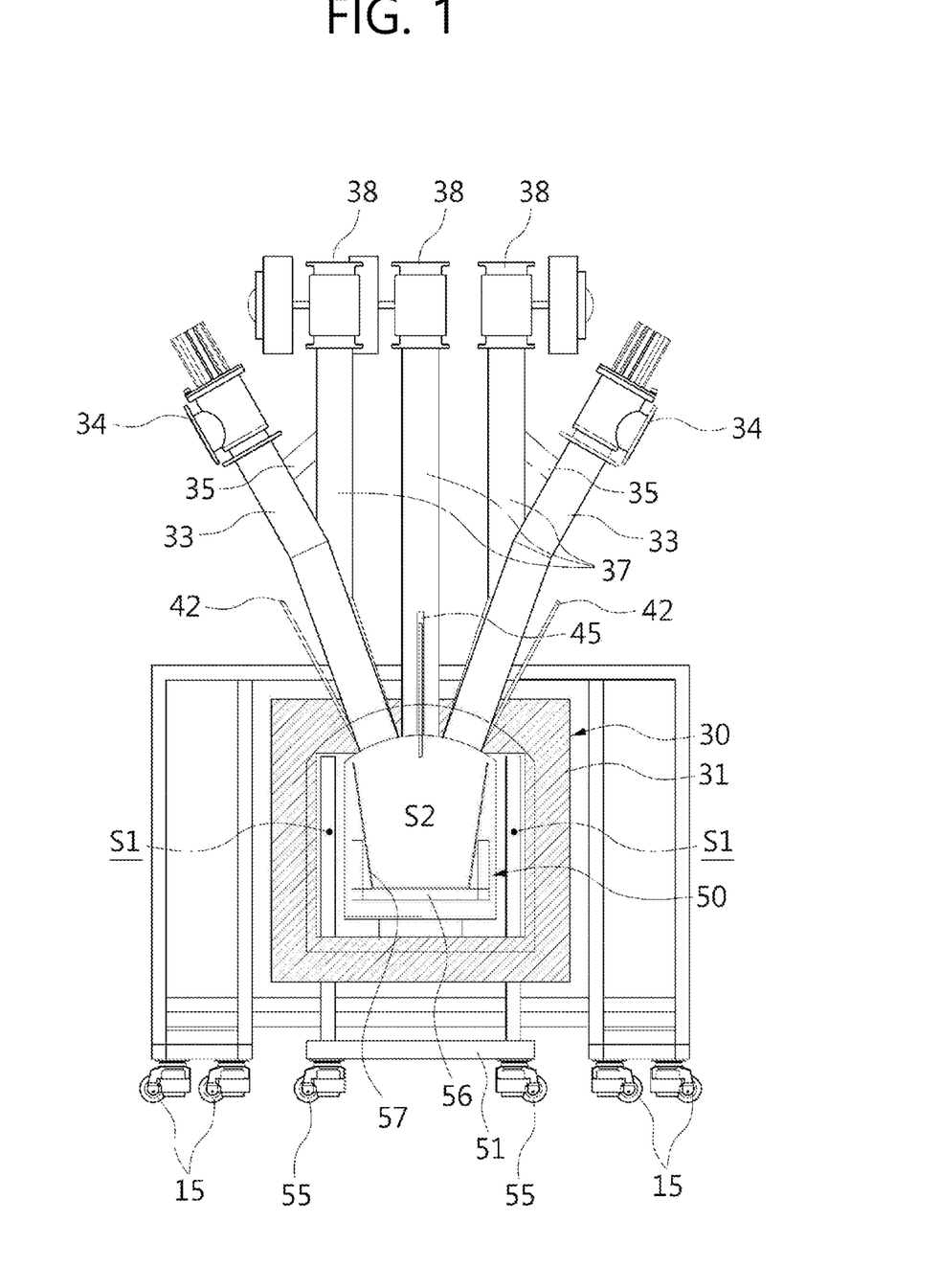
FIG. 1 is a cross-sectional view of a configuration of a preferred embodiment of a waste battery treatment apparatus using continuous heat treatment according to the present invention.
Figure 2:
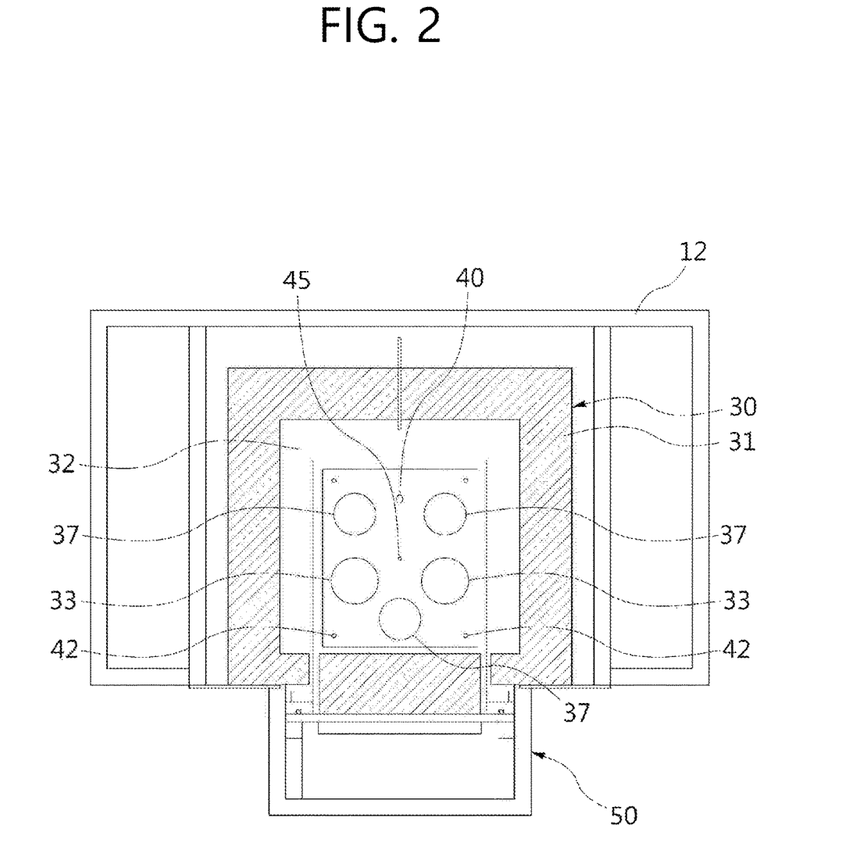
FIG. 2 is a plan view illustrating a top of the treatment apparatus illustrated in FIG. 1.

The frame 10 may have a substantially hexahedral frame body 12 as illustrated in FIGS. 1 and 2 and includes a moving means 15 at a lower portion thereof. The moving means 15 may be a wheel or rail structure and in the embodiment, the moving means 15 is constituted by multiple wheels.

A reaction reservoir 30 is installed in an internal space of the frame 10. An inlet of the reaction reservoir 30 is provided on the side of the frame 10. The reaction reservoir 30 has a rectangular shape in the embodiment. However, the shape of the reaction reservoir 30 may be variously formed. The reaction reservoir 30 may also be made of the stainless steel and since the reaction reservoir 30 is required to be excellent in explosion resistance, heat resistance, and corrosion resistance, the reaction reservoir 30 is made of, for example, SUS 3103S. The reason is that SUS 3103S contains more Ni—Cr, and a result, SUS 3103S is excellent in high-temperature strength and resistant to high-temperature oxidation.

Although not illustrated, the reaction reservoir 30 has a heating element. The heating element is installed in the reaction reservoir 30 itself or on an outer surface of the reaction reservoir 30 to generate heat. The heating element generates heat required for heat treatment in the reaction reservoir 30.

A soundproof material may be installed in a space formed between the outer surface of the reaction reservoir 30 and an inner surface of the frame 10. The soundproof material is used for minimizing noise generated in the reaction reservoir 30. As the soundproof material, a material may be preferably used, which also serves as a refractory material. The soundproof material may be positioned between the outer surface of the reaction reservoir 30 and the inner surface of the frame 10 or placed even between the bottom surface of the reaction reservoir 30 and the bottom of the frame 10.

An inlet 33 is installed in an upper housing 32 of the reaction reservoir 30. The inlet 33 is a part for inputting the waste battery which is an object to be treated into the reaction reservoir 30. The inlet 33 is installed through the upper housing 32.

As illustrated in FIG. 2, since the inlet 33 passes through the upper housing 32 as a whole, the inlet 33 extends perpendicularly to the upper housing 32 in a vertical direction. However, a part of an upper end of the inlet 33 extends obliquely. A direction in which the upper end of the inlet 33 extends obliquely is a central direction of the reaction reservoir 30 when the reaction reservoir 30 is viewed in a plane. The upper end of the inlet 33 is formed so as to facilitate an operation of inputting the waste battery into the inlet 33 from the outside of the frame 10 through an entrance formed at a front end of the inlet 33.

In the embodiment, the inlet 33 is installed through the upper housing 32, but may be installed through the side of the reaction reservoir 30.

A gas blocking door 34 is installed inside the entrance of the inlet 33. The gas blocking door 34 prevents internal and external environments of the reaction reservoirs 30 from influencing each other and in particular, prevents gas and dust generated during the heat treatment operation in the reaction reservoir 30 from being discharged to the outside during the input operation of the waste battery.

The gas blocking door 34 preferably has a structure in which an edge of the gas blocking door 34 may be in close contact with the inner surface of the inlet 33 and when force to push the gas blocking door 34 is removed after an elastic member is installed on a rotary shaft which becomes a rotary center when the gas blocking door 34 is opened/closed to push and open the gas blocking door 34, the gas blocking door 34 is configured to be automatically closed. Therefore, the internal and external environments of the reaction reservoir 30 are prevented from influencing each other during inputting the waste battery.

Gas outlets 37 are also installed at multiple places of the upper housing 32. The gas outlet 37 is used for discharging the poisonous gas and dust generated during the heat treatment. The gas outlet 37 is connected to a dust collector (not illustrated) to filter the dust through the dust collector. The dust is generally composed of battery powder and a main component is valuable metal powder. The poisonous gas moves to a scrubber and is neutralized by a NaOH solution which flows in the scrubber and discharged to the atmosphere. The gas outlet 37 need not be particularly installed in the upper housing 32. For example, the gas outlet 37 may be installed through the side of the reaction reservoir 30.

A clamp 38 is provided at one end of the gas outlet 37. When the inside of the reaction reservoir 30 becomes a vacuum state by a vacuum forming means 40 to be described below, the clamp 38 as an operable structure may maintain the vacuum state.

In this case, a connection pipe 35 is provided between the gas outlet 37 and the inlet 33. As a result, the poisonous gas and the dust in a treatment space S1 may not be discharged to the outside through the inlet 33 but guided to the gas outlet 37 through the connection pipe 35. That is, the poisonous gas and the dust may be prevented from being discharged through the inlet 33 even during inputting the waste battery through the inlet 33 in addition to the heat treatment process through the connection pipe 35.

The vacuum forming means 40 is connected to the treatment space S1 of the reaction reservoir 30. The vacuum forming means 40 serves to form the treatment space S1 in the vacuum state in connection with the treatment space S1 of the reaction reservoir 30. As the treatment space S1 of the reaction reservoir 30 becomes the vacuum state by the vacuum forming means 40, oxygen of the treatment space S1 may be maximally removed, and as a result, an explosion possibility may be minimized during the waste battery treatment process. A rotary pump is provided in the vacuum forming means 40 to selectively vacuum-treat the inside of the treatment space S1 of the reaction reservoir 30 and in the embodiment, the rotary pump is vacuum-controlled up to a maximum of $10^{-4}$ torr within 5 minutes. Of course, the vacuum forming means 40 need not be particularly limited to the rotary pump and may be configured by various configurations such as a mechanical vacuum pump, an injection pump, or a diffusion pump.

A gas inlet 42 is provided in the reaction reservoir 30, which inputs inert gas into the treatment space S1 from the outside in connection with the treatment space S1 in the reaction reservoir 30. Four gas inlets 42 are installed in the illustrated embodiment. Lengths of the gas inlets 42, which extend into the reaction reservoir 30 may be different from each other, which are used for more evenly distributing the inert gas injected through the gas inlets 42, for example, nitrogen (N2) into the reaction reservoir 30. The inert gas injected through the gas inlet 42 serves to minimize explosion of the waste battery in the reaction reservoir 30.

A sensor 45 is provided in the upper housing 32 of the reaction reservoir 30. The sensor 45 is used for measuring a temperature in the reaction reservoir 30. The sensor 45 is installed to extend into the reaction reservoir 30 by penetrating the center of the upper housing 32. Of course, the sensor 45 may be a complex sensor that measures various environmental conditions such as the vacuum state, a pressure state, and humidity as well as the temperature of the reaction reservoir 30.

A storage device 50 is input and output through the opened side of the frame 10. A part of the storage device 50 is inserted into the treatment space S1 of the reaction reservoir 30 to store the waste battery which is the object to be treated and while the storage device 50 stores the heat-treated waste battery, the storage device 50 itself is separated to the outside of the waste battery treatment apparatus, and as a result, the waste battery may be very easily collected.

Of course, conversely, while the object to be treated which is not yet heat-treated is stored in the storage device 50, the object to be treated may be input into the treatment space S1 of the reaction reservoir 30.

When the storage device 50 is described more specifically, the storage device 50 is constituted by a lower frame 51 with a moving device 55 and an upper frame 53 which extends upward from the lower frame 51.

The moving device 55 is configured by a wheel or a moving rail, and as a result, the storage device 50 may easily move to the inside or the outside of the treatment space S1 of the reaction reservoir 30. In the illustrated embodiment, the moving device 55 is configured by the wheel, but may be configured in a moving rail structure which moves along the rail provided on the bottom.

Figure 3:
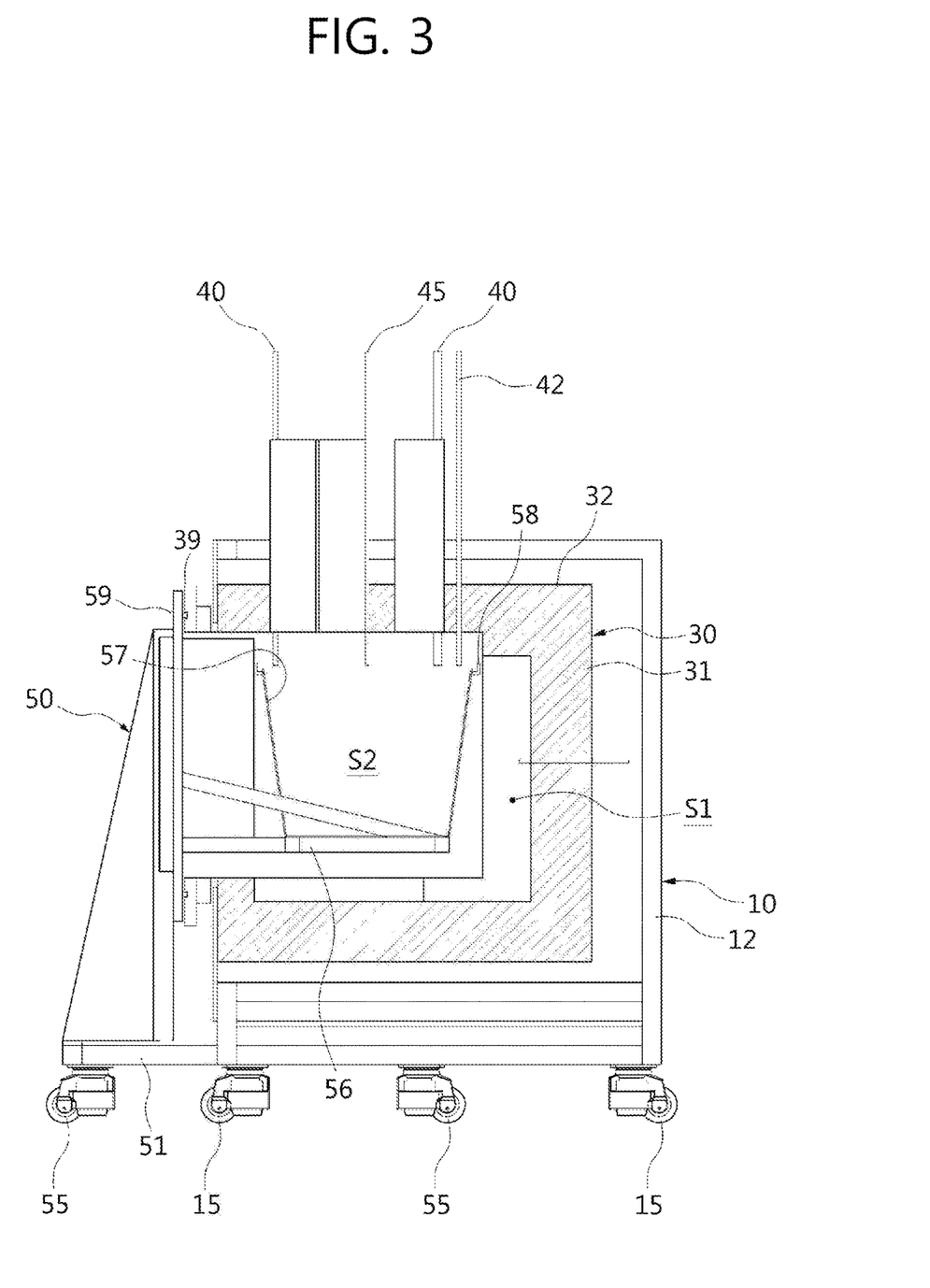
FIGS. 3 and 4 are operation state diagrams sequentially illustrating a state in which a reaction reservoir is input/output into/from the waste battery treatment apparatus using continuous heat treatment according to the present invention.

A pedestal 56 is provided in the upper frame 53 and a basket 57 is seated in the pedestal 56. The basket 57 is a part that substantially stores the waste battery which is the object to be treated and a storage space S2 is formed in the basket 57 as illustrated in FIG. 3.

A shielding plate 59 is provided in an upper frame 53 of the storage device 50 and the shielding plate 59 serves to shield one opened side of the treatment space S1 when the storage device 50 is inserted into the treatment space S1 of the reaction reservoir 30. After the shielding plate 59 is in close contact with an opening 39 formed at the entrance of the reaction reservoir 30, the shielding plate 59 and the opening 39 may be coupled to each other by a fixing means such as a bolt. Of course, a sealing member may be provided between the shielding plate 59 and the opening 39 so as to more closely maintain the vacuum state of the treatment space S1.

In this case, the basket 57 is configured to be separable from the pedestal 56 and a hanger 58 selectively hung by a hoist (not illustrated) is provided in the basket 57. As a result, the hanger 58 is hung on the hoist, and as a result, the basket 57 may be easily elevated.

Hereinafter, a method for performing a pretreatment process for separating the valuable metals from the waste battery by extracting the valuable metals from the waste battery by using the waste battery treatment apparatus using continuous heat treatment and performing the following process according to the present invention will be described.

Figure 4:
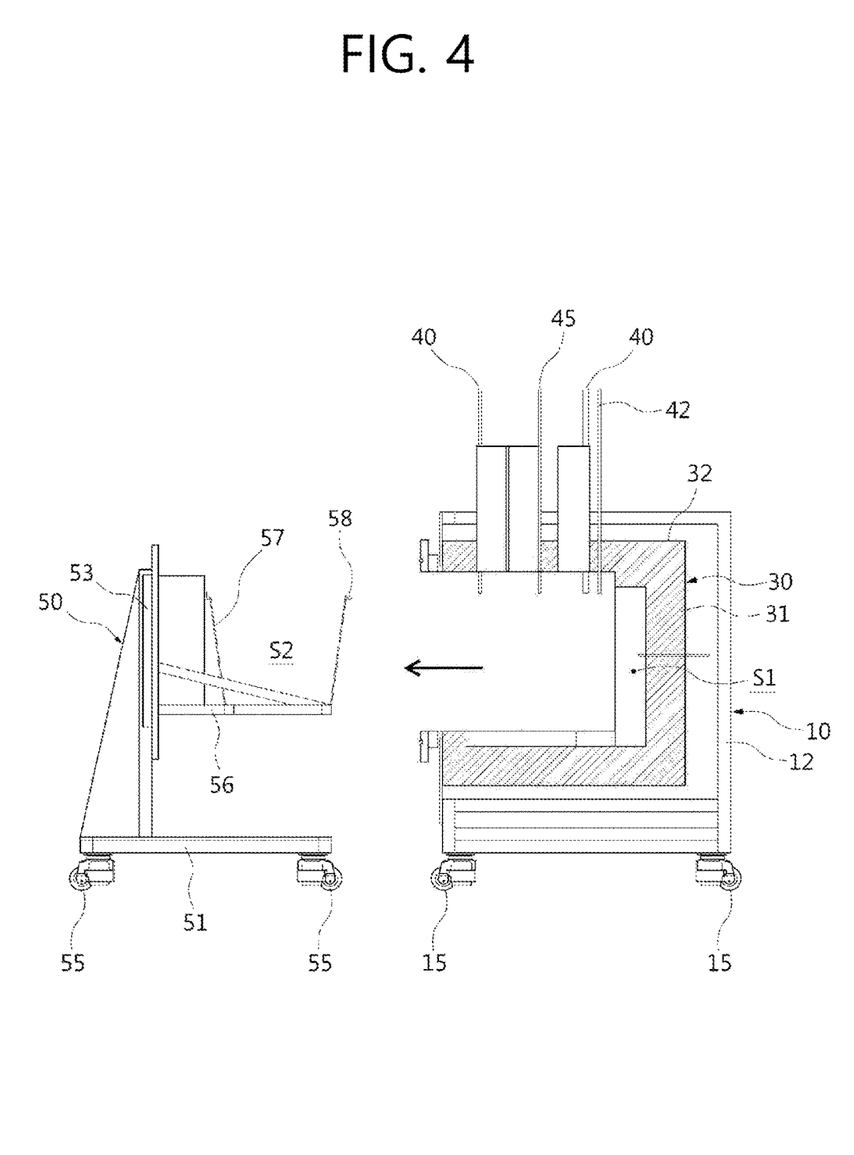
Figure 5:
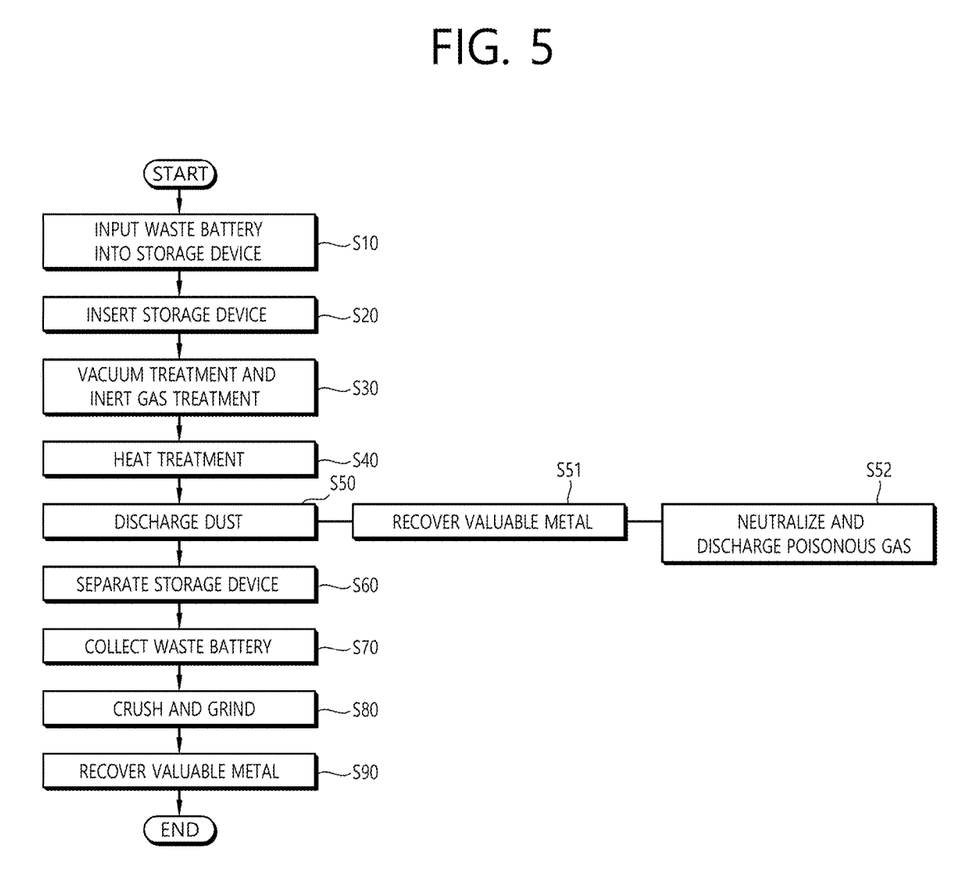
FIG. 5 is a flowchart according to an embodiment of a method for recovering valuable metals of the present invention.

First, as illustrated in FIG. 4, an operation is preceded, which inputs the waste battery which is the object to be treated into the basket 57 of the storage device 50 while separating the storage device 50 from the reaction reservoir 30 (S10). That is, the waste battery is input into the treatment apparatus of the reaction reservoir 30 by using the storage device 50 prior to the pretreatment (S20). Of course, this step may be omitted and the waste battery may be input through the inlet 33 after heating the reaction reservoir 30 later and inputting the waste battery using the basket 57 and inputting the waste battery through the inlet 33 may be simultaneously used.

In this case, since the moving device 55 is provided in the storage device 50, the storage device 50 may very easily move.

When the storage device 50 is inserted into the treatment space S1, the inside of the treatment space S1 of the reaction reservoir 30 is formed in the vacuum state (S30). That is, the inside of the treatment space S1 of the reaction reservoir 30 becomes the vacuum state by the vacuum forming means 40 and in the embodiment, the inside of the treatment space S1 of the reaction reservoir 30 is vacuum-controlled up to a maximum of $10^{-4}$ torr within 5 minutes by using the rotary pump provided in the vacuum forming means 40. As a result, the oxygen in the treatment space S1 may be removed and the explosion possibility may be maximally suppressed in a heat treatment step.

In this state, the inert gas is injected into the treatment space S1 of the reaction reservoir 30 through the gas inlet 42. In the embodiment, nitrogen (N2) is injected into the treatment space S1. Of course, the gas injection may be omitted in this step and achieved during the heat treatment process or the inert gas may be additionally injected during the heat treatment process.

Next, the heat treatment of the reaction reservoir 30 is performed (S40). The storage device 50 is inserted into the reaction reservoir 30 to be sealed, and as a result, the treatment space S1 is shielded from the outside. Therefore, the reaction reservoir 30 becomes a state to pretreat the waste battery. In order to enable the heat treatment of the waste battery in the reaction reservoir 30, the heating element generates heat to make the temperature of the reaction reservoir 30 at approximately 470 to 550° C. and thereafter, the heat treatment is performed while inputting approximately 10 waste batteries per minute through the inlet 33. All quantities of waste batteries which may be treated in the reaction reservoir 30 vary depending on the size of the reaction reservoir 30, but it is preferable to input the waste battery into the reaction reservoir 30 at a speed of 5 to 15 waste batteries per minute as a battery supply speed. Of course, the reaction reservoir 30 may be in the state in which the waste battery is input into the treatment space S1 by using the storage device 50.

Since the inlet 33 is shielded by the gas blocking door 34, the internal and external environments of the reaction reservoir 30 are prevented from influencing each other and when the waste battery is input for the heat treatment, the waste battery is input by temporarily opening the gas blocking door 34. When the waste battery is input, the gas blocking door 34 is closed again by elastic force of the elastic member to prevent the poisonous gas or dust from being discharged to the outside from the inside of the reaction reservoir 30.

During inputting the waste battery into the reaction reservoir 30 through the inlet 33, the entrance obliquely faces the central direction of the reaction reservoir 30, and as a result, an operator may more easily input the waste battery into the reaction reservoir 30 through the inlet 33.

During performing the operation, the inert gas is injected into the reaction reservoir 30 through the gas inlet 42 to prevent explosion from occurring in the reaction reservoir 30 and cooling water is injected through a cooling water inlet to prevent a seal from being deteriorated.

Meanwhile, the poisonous gas and the dust generated during the heat treatment are discharged through the gas outlet 37 (S50). The discharged poisonous gas and dust passes through the collector and passes through the scrubber again. During such a process, the valuable metal powders included in the dust are filtered (S51) and the poisonous gas is neutralized with the NaOH solution in the scrubber and discharged to the atmosphere (S52).

When a waster battery having a predetermined capacity is input into the reaction reservoir 30 and all of the pretreatment processes are end, the heat-treated waste battery which remains in the reaction reservoir 30 is collected (S60).

To this end, first, the storage device 50 is separated from the reaction reservoir 30. That is, since the storage device 50 is movable by the moving device 55, the storage device 50 itself is separated from the outside of the reaction reservoir 30 after the heat treatment ends.

Therefore, as illustrated in FIG. 4, the basket 57 of the storage device 50 is exposed to the outside and the heat-treated waste battery is stored in the storage space S2 of the basket 57.

In this state, the hoist may be used for separating the basket 57. A hoist motor of the hoist is driven, and as a result, a traction hook is hung on the hanger 58 of the basket 57. In this state, when the traction hook is lifted, the basket 57 may move while the basket 57 is lifted.

The waste battery which is subjected to continuous heat treatment as described above is collected by the storage device 50 (S70), transferred to a crusher and crushed/ground (S80) and thereafter, the valuable metal powder in a battery component and a battery is separated and recovered by means of a magnetic separation and sieving machine (S90).

In such a process cycle, the step (S20) of inserting the storage device 50 into the reaction reservoir 30 in which the step (S60) of collecting the waste battery ends starts again to continuously perform the process.

Hereinabove, even if it is described that all of constituent elements constituting the embodiment of the present invention are coupled as a single unit or coupled to be operated as a single unit, the present invention is not necessarily limited to the embodiment. That is, among the components, one or more constituent elements may be selectively coupled to be operated within the scope of the object of the present invention. Unless explicitly described to the contrary, since the word "include", "constitute" or "have" implies the inclusion of stated elements, it may be analyzed that the word "include", "constitute" or "have" means not the exclusion of any other elements but further inclusion of any other elements. Further, if not contrarily defined, all terms used herein including technological or scientific terms have the same meanings as those generally understood by a person with ordinary skill in the art. A generally used terminology which is defined in a dictionary should be interpreted to be equal to a contextual meaning of the related technology but is not interpreted to have an ideal or excessively formal meaning, if it is not apparently defined in the present invention.

The above description just illustrates the technical spirit of the present invention and various changes and modifications can be made by those skilled in the art to which the present invention pertains without departing from an essential characteristic of the present invention. Accordingly, the embodiments disclosed herein are intended to not limit but describe the technical spirit of the present invention but the scope of the technical spirit of the present invention is not limited by the embodiments. The scope of the present invention should be interpreted by the appended claims and all technical spirit in the equivalent range thereto should be interpreted to be embraced by the claims of the present invention.

For example, in the embodiment, it is described that the storage device 50 is stored in the reaction reservoir 30 to be separated as an example, but the storage device 50 may be fixed to the reaction reservoir 30.

The invention claimed is:

1. A method for recovering valuable metals by a continuous heat treatment process from a lithium-based battery by using a waste battery treatment apparatus using continuous heat treatment, which includes a frame, a reaction reservoir, a vacuum forming means, and an inlet, the method comprising:

a vacuum forming step of vacuumizing the inside of the reaction reservoir by using the vacuum forming means;

a heat treatment step of inputting and heat-treating waste batteries to be treated by opening a gas blocking door of the inlet;

a closing step of closing the gas blocking door in order to prevent poisonous gas or dust in the reaction reservoir from being discharged to the outside after the waste battery inputting step;

a gas discharging step of discharging the poisonous gas and dust generated during the heat treatment through a gas outlet;

a gas treatment step of separating and treating valuable metal powder included in the discharged dust in the gas discharging step;

a collection step of collecting the waste batteries heat-treated through the heat treatment step from the reaction reservoir; and a step of crushing or grinding the collected waste batteries and thereafter, separating and recovering the valuable metal powder of the crushed or ground waste batteries, wherein the method further comprises a storage device inserting step of inputting the waste batteries to be treated into a storage device which can be input into/output from a treatment space of the reaction reservoir and thereafter, moving the storage device and inserting the storage device into the treatment space of the reaction reservoir prior to the heat treatment step; and a reaction reservoir separating step of separating the storage device from the treatment space of the reaction reservoir and discharging the separated storage device to the outside prior to the collection step, wherein the storage device includes a lower frame with a moving device, an upper frame which extends upward from the lower frame, and a basket provided in the upper frame and having a storage space capable of the waste batteries to be treated therein.

2. The method for recovering valuable metals from a lithium-based battery by using a waste battery treatment apparatus using continuous heat treatment of claim 1, further comprising:

a step of injecting inert gas into the treatment space through a gas inlet in order to prevent the inside of the reaction reservoir from exploding subsequently to the vacuum forming step.

* * * * *